United States Patent
Onitsuka

(10) Patent No.: US 10,212,305 B2
(45) Date of Patent: Feb. 19, 2019

(54) COMMUNICATION APPARATUS AND METHOD AND NON-TRANSITORY COMPUTER READABLE MEDIUM FOR SENDING PROCESSING RECORDS TO MULTIPLE DESTINATIONS

(71) Applicant: FUJI XEROX CO., LTD., Tokyo (JP)

(72) Inventor: Miki Onitsuka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 138 days.

(21) Appl. No.: 15/350,935

(22) Filed: Nov. 14, 2016

(65) Prior Publication Data

US 2017/0331974 A1 Nov. 16, 2017

(30) Foreign Application Priority Data

May 13, 2016 (JP) ................................. 2016-096986

(51) Int. Cl.
| | | |
|---|---|---|
| G06F 15/00 | (2006.01) | |
| G06F 3/12 | (2006.01) | |
| G06K 1/00 | (2006.01) | |
| H04N 1/32 | (2006.01) | |
| H04N 1/00 | (2006.01) | |
| H04L 29/06 | (2006.01) | |

(52) U.S. Cl.
CPC ..... *H04N 1/32069* (2013.01); *H04N 1/00811* (2013.01); *H04L 69/18* (2013.01); *H04N 2201/0039* (2013.01); *H04N 2201/0081* (2013.01)

(58) Field of Classification Search
CPC ........... H04N 1/32069; H04N 1/00811; H04N 2201/0039; H04N 2201/0081; H04L 69/18
USPC ........................ 358/1.1, 1.15, 1.13, 1.14, 402
See application file for complete search history.

(56) References Cited

U.S. PATENT DOCUMENTS

| | | | | |
|---|---|---|---|---|
| 2013/0332526 A1* | 12/2013 | Hurley | ................. | G06F 3/0481 709/204 |
| 2014/0063549 A1* | 3/2014 | Sugaya | ............. | H04N 1/00225 358/1.15 |
| 2015/0207945 A1 | 7/2015 | Odaira | | |

FOREIGN PATENT DOCUMENTS

| | | |
|---|---|---|
| JP | H08-251327 A | 9/1996 |
| JP | 2015-139160 A | 7/2015 |

* cited by examiner

*Primary Examiner* — Douglas Q Tran
(74) *Attorney, Agent, or Firm* — Oliff PLC

(57) ABSTRACT

A communication apparatus includes a data sender and a processing record sender. The data sender sequentially sends data to m destinations, where m is an integer of two or greater. The processing record sender sends a processing record concerning the data sent to the first destination through a processing record concerning the data sent to the n-th destination to the n-th destination when the data sender sends the data to the n-th destination, where n is an integer of 1 to m. The processing record sender sends the processing record concerning the data sent to the first destination through a processing record concerning the data sent to the m-th destination to the first through (m−1)-th destinations when the data sender sends the data to the m-th destination.

9 Claims, 2 Drawing Sheets

COMMUNICATION APPARATUS AND METHOD AND NON-TRANSITORY COMPUTER READABLE MEDIUM FOR SENDING PROCESSING RECORDS TO MULTIPLE DESTINATIONS

CROSS-REFERENCE TO RELATED APPLICATIONS

This application is based on and claims priority under 35 USC 119 from Japanese Patent Application No. 2016-096986 filed May 13, 2016.

BACKGROUND

(i) Technical Field

The present invention relates to a communication apparatus and method and a non-transitory computer readable medium.

(ii) Related Art

The following feature is known. Plural destinations are specified, a document is then read at one time, and the resulting data is transferred to the specified plural destinations. This is called a multi-send feature. By using this multi-send feature, a user specifies plural destinations in a scanner and causes the scanner to start processing for reading a document. Then, when the reading processing has finished, the user can remove the document from the scanner and leave this place. The scanner sends a processing record to each destination. The processing record concerns reading processing for the data sent to a destination. Then, the user accesses the individual destinations by using a communication terminal of the user to check the processing records. However, the content of processing record is different among the plural destinations, and it is not easy to check whether the data has been sent to all the plural destinations.

SUMMARY

According to an aspect of the invention, there is provided a communication apparatus including a data sender and a processing record sender. The data sender sequentially sends data to m destinations, m being an integer of two or greater. The processing record sender sends a processing record concerning the data sent to the first destination through a processing record concerning the data sent to the n-th destination to the n-th destination when the data sender sends the data to the n-th destination, n being an integer of 1 to m. The processing record sender sends the processing record concerning the data sent to the first destination through a processing record concerning the data sent to the m-th destination to the first through (m−1)-th destinations when the data sender sends the data to the m-th destination.

BRIEF DESCRIPTION OF THE DRAWINGS

An exemplary embodiment of the present invention will be described in detail based on the following figures, wherein.

DETAILED DESCRIPTION

An exemplary embodiment of the invention will be described below.

(Configuration)

Figure 1:
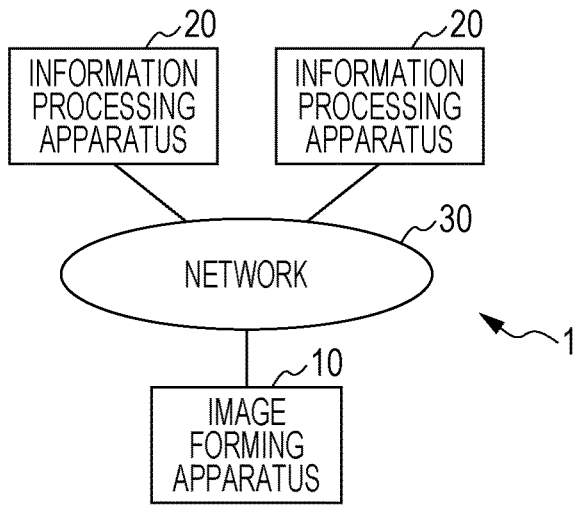
FIG. 1 is a block diagram illustrating the configuration of a communication system.

FIG. 1 is a block diagram illustrating the overall configuration of a communication system 1 according to an exemplary embodiment of the invention. The communication system 1 includes an image forming apparatus 10, which serves as a communication apparatus, plural information processing apparatuses 20, which serve as destinations for receiving data sent from the image forming apparatus 10, and a network 30, such as a local area network (LAN). The network 30 connects the image forming apparatus 10 and the information processing apparatuses 20 so that they can communicate with each other. The information processing apparatuses 20 may be image forming apparatuses other than the image forming apparatus 10 or any information processing apparatuses that receive and store data, such as personal computers and server devices.

Figure 2:
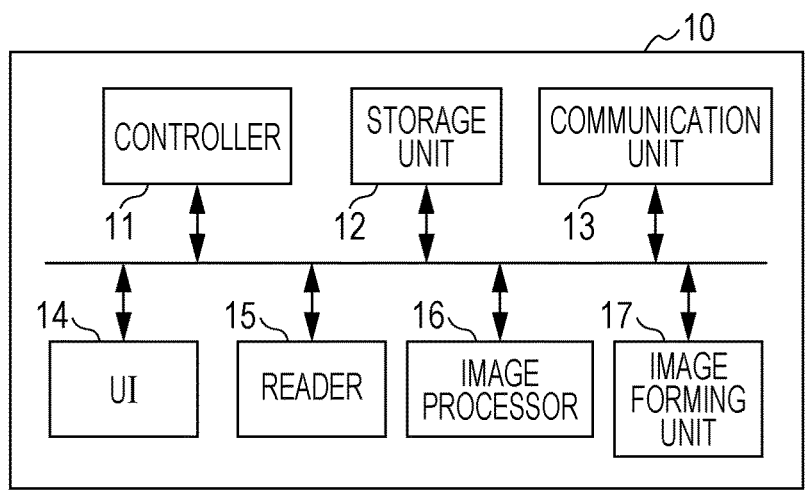
FIG. 2 is a block diagram illustrating the hardware configuration of an image forming apparatus.

FIG. 2 is a block diagram illustrating the hardware configuration of the image forming apparatus 10. The image forming apparatus 10 is an example of a communication apparatus of an embodiment of the invention. The image forming apparatus 10 includes a controller 11, a storage unit 12, a communication unit 13, a user interface (UI) 14, a reader 15, an image processor 16, and an image forming unit 17.

The controller 11 includes a processor such as a central processing unit (CPU) and storage devices such as a read only memory (ROM) and a random access memory (RAM). The controller 11 serves as a display controller that performs display control, which will be discussed later. In the ROM, firmware which describes procedures for starting hardware and an operating system (OS) is stored. The RAM is used for storing data used by the CPU to execute operations. The storage unit 12 includes a semiconductor memory and a hard disk drive and stores application programs for operating the OS and implementing various functions. The communication unit 13 includes a communication interface (IF) for communicating with external electronic devices. The communication unit 13 is connected to the network 30.

The UI 14 includes a display unit and an operation unit. The display unit includes a liquid crystal display, for example, and displays a screen on the display surface for a user to operate the image forming apparatus 10. The operation unit includes a touch panel which covers the display surface of the display unit and a keyboard located next to the display surface. The operation unit receives an operation performed by the user and outputs a signal indicating the content of the operation to the controller 11. The controller 11 controls the image forming apparatus 10 in accordance with the content of the operation.

The reader 15 optically reads a document and generates image data. The reader 15 is, for example, an image scanner including platen glass, a light source, an optical system, a color filter, and imaging elements. The light source applies light to a document placed on the platen glass, and light reflected by the document is incident on the imaging elements via the optical system and the color filter. The imaging elements convert the incident light into an image signal and output it to the image processor 16. The image processor 16 performs image processing such as screen processing and color conversion on the image signal received from the reader 15 so as to generate raster data. The image forming unit 17 forms an image on paper, which is a recording medium, on the basis of the raster data generated by the image processor 16. Examples of the image forming method are an electrophotographic system and an inkjet method.

In this exemplary embodiment, the so-called multi-send feature can be used in which plural destinations are specified in the image forming apparatus 10, a document is then read at one time, and the resulting data is transferred to the specified plural destinations. By using this multi-send feature, a user specifies plural destinations in the image forming apparatus 10 and causes the image forming apparatus 10 to start processing for reading a document. Then, when the reading processing has finished, the user can remove the document from the image forming apparatus 10 and leave this place. The image forming apparatus 10 sends the image data and a processing record to each destination via the network 30. The processing record concerns processing for the image data sent to a destination, and more specifically, the processing record includes various parameters used for reading processing of the document. The processing record is sent to a destination immediately after the image data is sent to this destination. The information processing apparatus 20, which is a destination of the image data, may control the storage location of the received image data and change the file name of the image data by using the received processing record.

The user accesses each information processing apparatus 20 via the network 30 by using a communication terminal (not shown) of the user and checks the processing record stored in each information processing apparatus 20 so as to determine whether a series of operations starting from reading of the document to sending of the image data has been completed.

The content of the processing record is different among the plural information processing apparatuses 20 (destinations). That is, the processing record stored in a first information processing apparatus 20 is that concerning processing for the image data only to the first information processing apparatus 20, and the processing record stored in a second information processing apparatus 20 is that concerning processing for the image data only to the second information processing apparatus 20. If the user accesses one of the information processing apparatuses 20 to check the processing record, this processing record concerns processing only for the image data sent to this information processing apparatus 20. The user is thus unable to check whether the image data has been sent to all the information processing apparatuses 20 specified as the destinations. If the user accesses all the information processing apparatuses 20, the user can check whether the image data has been sent to all the information processing apparatuses 20. This is however a cumbersome procedure.

Figure 3:
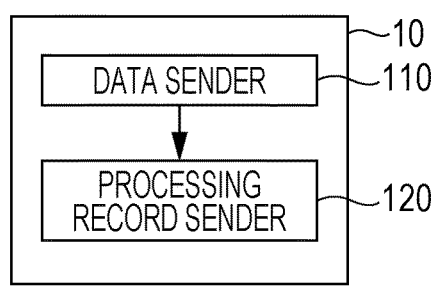
FIG. 3 is a block diagram illustrating the functional configuration of the image forming apparatus.

To handle such a situation, the image forming apparatus 10 has functions such as a data sender 110 and a processing record sender 120 shown in FIG. 3. The data sender 110 sequentially sends image data to m information processing apparatuses 20 (m is an integer of two or greater), which are m destinations specified by the user. There are plural protocols used for sending and receiving image data. The data sender 110 thus uses different protocols to send the image data to at least two of the m destinations.

When the data sender 110 has sent the image data to the n-th destination (n is an integer of 1 to m), the processing record sender 120 sends the processing record concerning the image data sent to the first destination through the processing record concerning the image data sent to the n-th destination to the n-th destination. When the data sender 110 has sent the image data to the m-th destination, the processing record sender 120 sends the processing record concerning the image data sent to the first destination through the processing record concerning the image data sent to the m-th destination to the first through (m−1)-th destinations. Information regarding the need to send a processing record is set for each destination. The processing record sender 120 sends a processing record only to a destination that requires the processing record.

(Operation)

Figure 4:
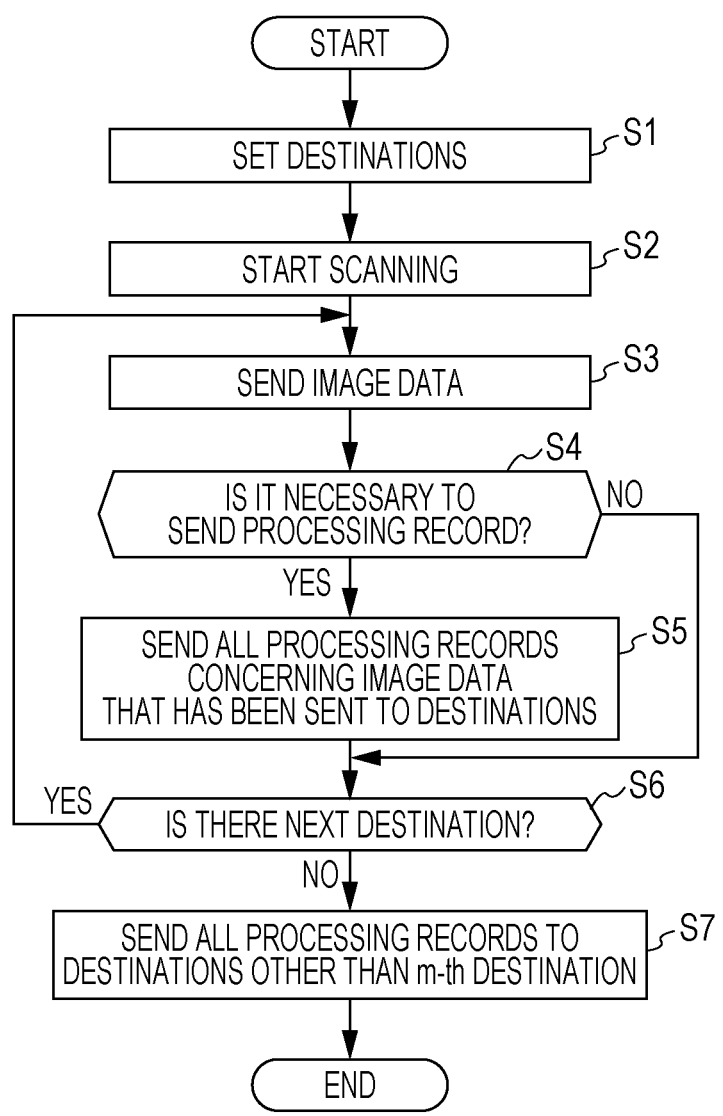
FIG. 4 is a flowchart illustrating an operation performed by the image forming apparatus.

The operation of this exemplary embodiment will be discussed below with reference to the flowchart of FIG. 4. In step S1, the controller 11 receives a user operation for setting various parameters used for reading processing and for specifying plural destinations on a setting screen displayed on the UI 14. The parameters indicate information concerning whether color or black-and-white scanning is performed, the resolution, the data format, etc. The user may set a setting for each destination whether to keep a processing record in a destination in step S1. Alternatively, the user may set this setting before step S1.

In step S2, in response to a processing start operation by a user, the controller 11 causes the reader 15 to start scan processing for reading a document in accordance with the set parameters. Then, in step S3, the controller 11 sends image data generated by reading the document to the first destination. The order in which image data is sent to plural destinations may be decided in any manner. Then, in step S4, the controller 11 determines from the above-described settings whether to send the processing record concerning the image data to the first destination. If it is necessary to send the processing record to the first destination (the result of step S4 is YES), the controller 11 sends the processing record to the first destination in step S5. This processing record includes, not only the above-described parameters regarding whether color or black-and-white scanning is performed, the resolution, the data format, etc., but also the protocol name used for sending the image data and the data format of the image data.

The controller 11 then determines in step S6 whether there is a second destination to which the image data will be sent. If there is a second destination, the controller 11 sends the image data to the second destination in step S3. The controller 11 then determines in step S4 whether to send the processing record to the second destination. If it is necessary to send the processing record to the second destination (the result of step S4 is YES), the controller 11 sends the processing record concerning the image data sent to the first destination and the processing record concerning the image data sent to the second destination to the second destination in step S5.

In this manner, if it is determined in step S6 that there is the n-th (n is 1 to m) destination, the controller 11 sends the image data to the n-th destination in step S3. If it is determined in step S4 that it is necessary to send the processing record to the n-th destination, the controller 11 sends the processing record concerning the image data sent to the first destination through the processing record concerning the image data sent to the n-th destination to the n-th destination.

By repeating such a procedure, when the sending of the image data and the processing record to the final m-th destination has finished (NO in step S6), the processing record concerning the image data for the first destination has been sent to the first destination, the processing record concerning the image data for the first destination and that for the second destination have been sent to the second destination, the processing record concerning the image data for the first destination through that for the (m−1)-th destination have been sent to the (m−1)-th destination, and the processing record concerning the image data for the first destination through that for the m-th destination have been sent to the m-th destination. That is, the processing records concerning the image data for all the destinations are stored only in the m-th destination (information processing apparatus 20).

Then, in step S7, the controller 11 sends the processing records for the first through m-th destinations to the destinations other than the m-th destination, that is, the first through (m−1)-th destinations. The first through (m−1)-th destinations update the processing records received in step S5 to those received in step S7. As a result, all the processing records for the first through m-th destinations are sent and stored in the first through m-th destinations.

The above-described processing will be described through illustration of a specific example. The following SMB1, SMB2, FTP1, and HTTP1 indicate destinations. Protocols used for sending image data to these destinations are different from each other.

(1) Time point at which sending of image data and a processing record to SMB1, which is the first destination, has been successfully completed
1. SMB1 [completed]
2. SMB2
3. FTP1
4. HTTP1

(2) Time point at which sending of image data and a processing record to FTP1, which is the second destination, has failed with error
1. SMB1 [completed]
2. SMB2
3. FTP1 [failed]
4. HTTP1

(3) Time point at which sending of image data and a processing record to HTTP1, which is the third destination, has been successfully completed
1. SMB1 [completed]
2. SMB2
3. FTP1 [failed]
4. HTTP1 [completed]

(4) Time point at which sending of image data and a processing record to SMB2, which is the fourth destination, has been successfully completed
1. SMB1 [completed]
2. SMB2 [completed]
3. FTP1 [failed]
4. HTTP1 [completed]

(5) Time point at which sending of the processing records concerning image data sent to the first through fourth destinations to SMB1, FTP1, and HTTP1, which are the first through third destinations, has been successfully completed
1. SMB1 [completed]
2. SMB2 [completed]
3. FTP1 [failed]
4. HTTP1 [completed]

In this exemplary embodiment, it is possible to keep a record of all the results of sending data to plural destinations in each destination.

In the above-described exemplary embodiment, processing records concerning data for all destinations are sent to the m-th (final) destination first (immediately after the image data is sent to the m-th destination). By considering this point, the user may specify the information processing apparatus 20 that the user finds it easy to access as the m-th destination, and then access this information processing apparatus 20 to check the processing records for all the destinations.

Data to be sent and received is not restricted to image data. Consequently, the processing record does not necessarily include parameters used for reading a document.

In this exemplary embodiment, the above-described functions are implemented as a result of the controller 11 executing a program. Alternatively, the above-described functions may be implemented as a hardware circuit. The program may be recorded on a computer readable recording medium, such as an optical recording medium and a semiconductor memory. Then, the program may be read from the recording medium and installed into the communication apparatus. The program may be provided via a telecommunication line.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication apparatus comprising:
 a data sender that sequentially sends data to m destinations, m being an integer of two or greater; and
 a processing record sender that sends a processing record concerning the data sent to the first destination through a processing record concerning the data sent to the n-th destination to the n-th destination when the data sender sends the data to the n-th destination, n being an integer of 1 to m, and that sends the processing record concerning the data sent to the first destination through a processing record concerning the data sent to the m-th destination to the first through (m−1)-th destinations when the data sender sends the data to the m-th destination.

2. The communication apparatus according to claim 1, wherein the data sender uses different protocols to send the data to at least two of the m destinations.

3. The communication apparatus according to claim 1, wherein:
 information regarding whether it is necessary to send the processing record is set for each of the destinations; and
 the processing record sender sends the processing record to a destination that requires the processing record.

4. The communication apparatus according to claim 2, wherein:
 information regarding whether it is necessary to send the processing record is set for each of the destinations; and
 the processing record sender sends the processing record to a destination that requires the processing record.

5. The communication apparatus according to claim 1, wherein:
 the data indicates a result of reading a document; and
 the processing record includes a parameter used for reading the document.

6. The communication apparatus according to claim 2, wherein:
    the data indicates a result of reading a document; and
    the processing record includes a parameter used for reading the document.

7. The communication apparatus according to claim 3, wherein:
    the data indicates a result of reading a document; and
    the processing record includes a parameter used for reading the document.

8. The communication apparatus according to claim 4, wherein:
    the data indicates a result of reading a document; and
    the processing record includes a parameter used for reading the document.

9. A non-transitory computer readable medium storing a program causing a computer to execute a process, the process comprising:
    sequentially sending data to m destinations, m being an integer of two or greater; and
    sending a processing record concerning the data sent to the first destination through a processing record concerning the data sent to the n-th destination to the n-th destination when the data is sent to the n-th destination, n being an integer of 1 to m, and sending a processing record concerning the data sent to the first destination through a processing record concerning the data sent to the m-th destination to the first through (m−1)-th destinations when the data is sent to the m-th destination.

* * * * *